April 25, 1961  G. F. SPRAGENS  2,981,522
CONTINUOUS MIXING APPARATUS
Filed March 2, 1959  2 Sheets-Sheet 1

INVENTOR
GEORGE F. SPRAGENS

BY  W. E. Sherwood
ATTORNEY

April 25, 1961　　　G. F. SPRAGENS　　　2,981,522
CONTINUOUS MIXING APPARATUS

Filed March 2, 1959　　　　　　　　　　　　　　2 Sheets-Sheet 2

INVENTOR
GEORGE F. SPRAGENS
BY　W. E. Sherwood
ATTORNEY

United States Patent Office 2,981,522
Patented Apr. 25, 1961

2,981,522

CONTINUOUS MIXING APPARATUS

George F. Spragens, 7608 La Grange Road, Lyndon, Ky.

Filed Mar. 2, 1959, Ser. No. 796,308

12 Claims. (Cl. 259—3)

This invention relates to an improved continuous mixing apparatus and more particularly to a continuous mixing apparatus for materials undergoing a chemical reaction and necessitating a rapid mixing and dispensing.

For purposes of disclosure, the invention is described with respect to the mixing of ingredients employed in the manufacture of plastic foams, but, however, is in no way intended to be limited to such usage and on the contrary is intended to cover general mixing usages.

As is known, a particularly difficult problem is encountered in the mixing of the materials from which plastic foams, especially the polyurethane and isocyanate types, are to be produced. These foams are produced by mixing two or more liquids, one of which will contain a polyether or polyester resin and the other of which contains a catalyst. The chemical reaction therebetween will begin as soon as these liquids are combined and consistent foam products can be produced only when the ingredients are present in exact proportions and are properly mixed. Moreover, since the foam expansion begins promptly after the ingredients are mixed, it is essential that the properly mixed ingredients be discharged from the mixing apparatus into the mold immediately after the mixing is completed. For example, a typical mixing may be concluded in about 1-3 seconds and the mixed products will undergo complete foam expansion in the succeeding 2-3 minutes and thereafter will set or harden in the succeeding few minutes.

Furthermore, in view of this behavior of the materials, the mixing apparatus must be capable of being cleaned promptly after use, must not contain surfaces on which material can set and harden while in use, and must provide a uniform mixing of the materials passing therethrough. Other requirements of mixers for this particular type of product include the substantial elimination of entrained air and the ability to handle slurries, such as solid fillers and aggregates in conjunction with liquids.

It is a purpose of this invention therefore to provide an apparatus which will satisfy mixing requirements of the character above indicated.

An object of the invention is to provide an improved continuous mixing apparatus in which materials may be mixed uniformly, and rapidly, and without substantial entrainment of air.

Another object is to provide an improved self-cleaning mixing apparatus.

Another object is to provide an improved continuous mixing apparatus in which the amount of agitation of the materials being mixed, may be readily varied.

A further object is to provide an improved compact apparatus in which both mixing and dispensing of material may be carried out efficiently.

A still further object is to provide an improved continuous mixing apparatus in which liquids may be mixed uniformly with solids.

These and additional objects and advantages will become more readily apparent by reference to the following description and the accompanying drawings in which Fig. 1 is a diagrammatic view of an assembly of mixing and auxiliary apparatus incorporating the present invention.

In accordance with the invention there is provided a hollow rotatable receptacle having an inclined inner wall along which material ingredients entering at one end of the receptacle are adapted to be moved in mixed layer relationship toward a collecting region adjacent the other end of the receptacle.

A centrally apertured floor plate secured to the rotatable receptacle serves to define, in conjunction with the inclined inner wall, the collecting region for the materials and a material discharge element mounted in the aperture in that plate and extending into scooping relation to the material in the collecting region, serves to remove mixed material from the receptacle. As a feature of the invention, the receptacle is divided into two or more communicating chambers each of which is open to the atmosphere adjacent the center axis of the receptacle and resulting in a diminution of air entrainment in the mixed materials. The receptacle preferably is driven by its contact with the means which defines or separates the chambers and is suitably balanced so as to be dynamically stable at high speed. All surfaces of the receptacle with which the material is in contact are so shaped as to permit or assist in movement of the material into the collecting region under the influence of the centrifugal force of the rotating receptacle. The material discharge element is adjustable so as to provide for differing degrees of agitation of the material confined in the collecting region of the receptacle and at the same time provides for gravity discharge of the mixed material leaving the receptacle.

Figure 1:
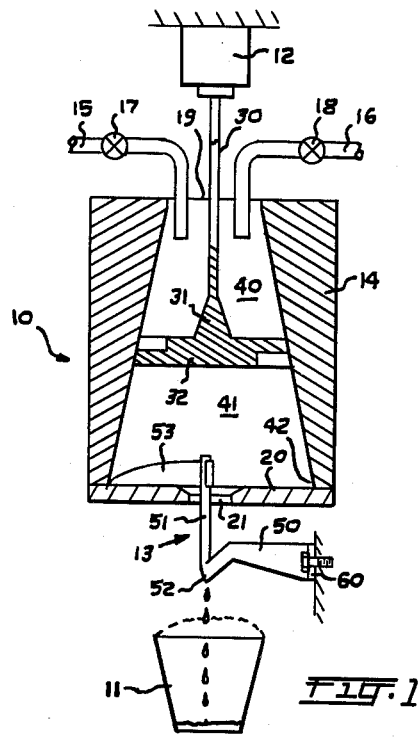

Referring now to Fig. 1 the mixing and dispensing apparatus, generally called a "mixing head," is indicated diagrammatically at 10 in operative relation to a suitable mold 11 into which the mixed material may be conveniently dispensed. It will be understood that the mold, the prime mover 12 of the drive means, the material discharge element 13, and the conduits for delivering materials to be mixed in the apparatus, will all be supported upon appropriate supports adjacent the mixing head. As indicated, a rotatable hollow receptacle 14 mounted in a non-horizontal and preferably vertical position receives materials to be mixed from a plurality of sources here represented by conduits 15 and 16. The supply of such materials in turn is controlled by any suitable means, here shown diagrammatically as valves 17 and 18, although equivalent means such as metering pumps or the like could be employed. More than two conduits, as when solids are to be incorporated in the mix, may also be employed.

As a significant feature, the interior walls of the receptacle slope axially from the first or upper end to the second or lower end and the upper end is formed with a centrally disposed opening 19 communicating with the atmosphere and through which the supply conduits discharge into the receptacle. At its lower end the receptacle is provided with a floor plate 20 having a centrally disposed aperture 21 therein. This floor plate preferably has a sufficiently smooth upper surface cooperating with the material discharge element, later to be described, so as to effect an efficient self-cleaning action by the apparatus. The upper surface of the floor plate may be suitably inclined, or curved, rather than being flat as shown.

Figure 2:
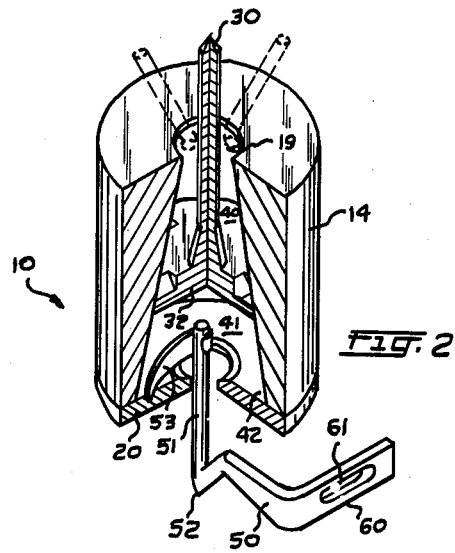
Fig. 2 is a perspective view, with portions cut away, showing one form of centrifugal mixer embodying the invention.
Figure 3:
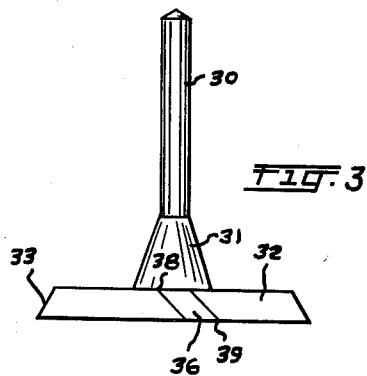
Fig. 3 is an elevation view of a chamber-defining member for use with the rotating receptacle of the mixer of Fig. 2.
Figure 4:
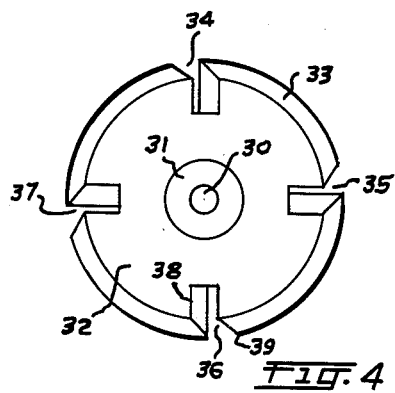
Fig. 4 is a plan view of the member of Fig. 3.

Extending into the opening 19 is a drive member 30 suitably connected to prime mover 12 and forming a stem of a chamber-defining means serving to support and to drive the rotatable receptacle. As best seen in Figs. 3 and 4, the stem preferably is enlarged into a generally conical portion 31 to which is joined a plate portion 32 herein called the transfer plate. At its periphery, the transfer plate has a bevelled edge 33 conforming to the slope of the inner wall of the receptacle and adapted to fit snugly thereagainst. Adjacent its periphery the transfer plate is provided with a plurality of apertures or slots, here shown at 34, 35, 36 and 37, each of which has a leading edge 38 and a trailing edge 39 and with a slope which extends opposite to the normal direction of rotation of the receptacle. Thus, the movement of the transfer plate under the material contained thereabove serves to effect a smooth and relatively uniform flow of material from above to beneath that plate. As best seen in Figs. 1 and 2, with the transfer plate in assembled position in the mixing head, an upper or distributing chamber 40 and a lower or mixing chamber 41 are thus defined with communication therebetween being afforded by the transfer slots positioned at regions wherein centrifugal force is strongest. It further will be noted that the distance from the axis of the receptacle to the nearer edge of the transfer apertures is at least equal to the distance from that axis to the nearer edge of aperture 21 in the floor plate. Thus, no likelihood of material dropping directly through the apparatus without undergoing its predetermined mixing, is possible. Various conventional means for holding the floor plate to the receptacle and the receptacle to the chamber-defining drive means may be used and may comprise set screws, spot welding, bolts or the like. The size, weight, and materials used in the receptacle and chamber-defining means, as well as the relative volumes of chambers 40 and 41, will, of course, be chosen so as to provide dynamic balance of the rotating parts and an acceptable through-put of properly mixed materials, and may be varied within wide ranges without departing from the invention.

With the foregoing description in mind and considering as an example the use of the apparatus in the manufacture of plastic foam, the liquid containing the resin when supplied by conduit 15 will thus drop into chamber 40 and splash upon the rotating plate 32 and by centrifugal force be thrown outwardly toward the sloping inner wall of the receptacle. The conical portion 31, it will be observed, serves to oppose any tendency of such liquid to move upwardly along the shaft 30. At the same time, the liquid containing the catalyst and passing from conduit 16, and also any solids being used for fillers or aggregates when supplied by another conduit, not shown, will drop into chamber 40 and partake of the same motion. Accordingly, a remarkably uniform distribution of such materials, regardless of the specific gravity of the same, will immediately take place in chamber 40 and with such materials flowing over one another in sheet-like form as they move along the rotating surfaces.

As these materials reach the region of the transfer slots they are promptly transferred to the upper part of the sloping wall in mixing chamber 41 under the combined influence of centrifugal force and gravity and then move as intermingled sheets toward the collecting region 42 defined by the junction of the inner wall of the receptacle and the bottom plate 20.

Here they collect in a hollow rotating pool or body of material and without air entrained therein, it being apparent that any air displaced by the heavier liquids under centrifugal forces will be forced outwardly of the apparatus through the respective openings 19 and 21.

Figure 5:
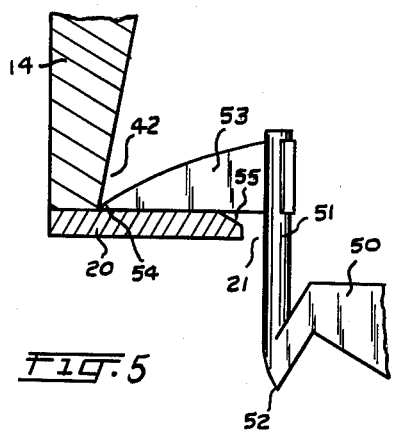
Fig. 5 is a side elevation view of a portion of the material discharge element in cooperative mixing relation to a portion of the receptacle under one condition of material agitation.
Figure 6:
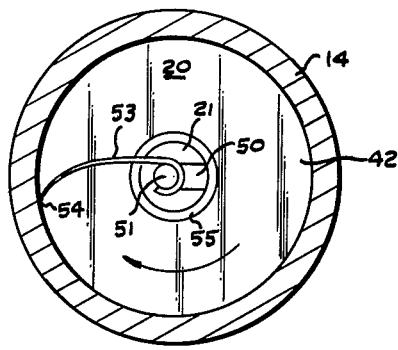
Fig. 6 is a plan view of the floor plate of the mixer receptacle showing the material discharge element in the position relative thereto as exemplified by Fig. 5.

Considering now Figs. 1, 5 and 6, there is shown one suitable form of means for removing the mixed materials from the continuous mixing apparatus during rotation of the receptacle, although other means may be employed without departing from the broader aspects of the invention. For convenience, however, I prefer to employ a material-removing-means which provides not only for dispensing of the mixed material into small openings in molds, but which also is capable of exerting of control on the amount of mixing given to that material. Both of these functions are found in the material-discharge-element 13 which may include a bracket portion 50 used in mounting the same, and a flow directing guide 51. Intermediate these two parts, a depending projection 52 is located and from which the mixed materials drops by gravity, either as separate drops or as a continuous rod, into mold 11. The discharge-element may be stationary or may be rotatable, but in either case must present a relative movement with respect to the rotatable receptacle 14. As shown, the discharge-element is mounted in a stationary but selectively adjustable relation with respect to that receptacle.

In the form shown, the upper end of the flow directing guide 51 extends into the interior of mixing chamber 41 through the opening 21 and has affixed thereto a scoop blade 53. This blade is preferably, but not necessarily, formed with a curvature extending in a direction opposite the direction of rotation of the receptacle as seen in Fig. 6 and the lower edge of the blade lies in contact with the upper surface of bottom plate 20. Moreover, the blade varies in width from its largest width adjacent the flow directing guide 51 to a narrower width at the end 54 which projects into the collection region 42. Preferably, the blade is formed of a material having some resilience, so as to press into contact with the wall of receptacle 14 during the final cleaning stage. As will be understood, the relative rotation of the pool of material held in region 42, with respect to the end 54 of the blade, will cause a turbulent mixing action to occur in this region and with part of the material passing over the inclined top of the blade which acts somewhat as a weir, and with another portion of the material flowing centripetally along the blade to the flow directing guide 51. Upon reaching that guide, the mixed material then flows therealong by gravity and drops freely from the projection 52. As a significant feature, this flow is accomplished without substantial entrainment of air.

As seen in Fig. 5, the edge of bottom plate 20 at the central aperture is bevelled at 55 in a direction serving to return to the collecting region any material which is pulled to the edge of that aperture and which would tend to fall from the blade before reaching the flow directing guide 51.

The effective mixing action required upon various materials may differ and to accomplish such variation, various shapes and designs of scoop blade 53 may be substituted for that shown herein without departing from the invention, and while utilizing the remainder of the apparatus as described. It also is contemplated that the degree of mixing may be varied by shifting the scoop blade with respect to the collecting region 42 and as shown in Fig. 7 a second degree of turbulence of the material within the receptacle is achieved by shifting bracket 50 within the aperture 21 thus to bring end 54 of the scoop blade nearer the edge of that aperture.

Figure 7:
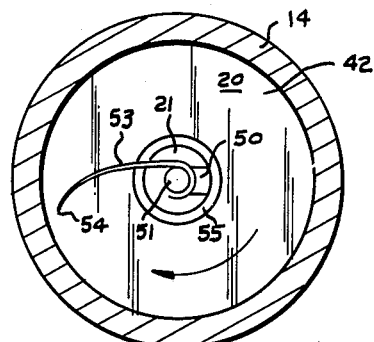
Fig. 7 is a plan view similar to Fig. 6 and showing the material discharge element in a second position and indicative of a different condition of material agitation.

When mixing the ingredients of plastic foam in the illustrative example, the self-cleaning action of the mixing head assumes importance and at the conclusion of a mixing cycle the end 54 of the blade is preferably disposed in close contact with the wall surfaces of the collecting region 42 even though during that cycle it may have been positioned as illustrated in Fig. 7. As will be seen, the interior portions of the receptacle are such that centrifugal force tends to direct all material to that collecting region and no other pockets in which material could collect, will be present. Thus upon continued rotation of the receptacle following cessation of supply through conduits 15 and 16, the scoop removes all material, leaving the apparatus in clean condition for the next cycle of operation. Normally, however, the flow directing guide 51 is wiped clean following a cycle of operation.

Figure 8:
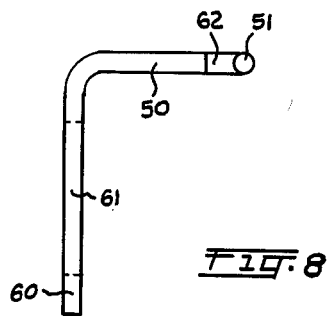
Fig. 8 is a plan view of the material discharge element bracket with the scoop member removed.
Figure 9:
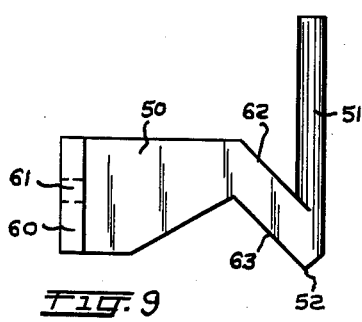
Fig. 9 is a side elevation view of the bracket of Fig. 8.
Figure 10:
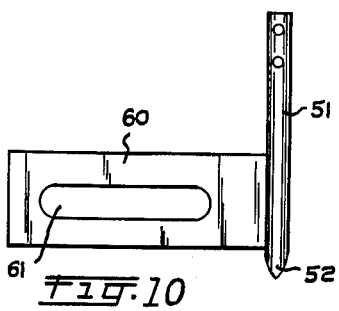
Fig. 10 is an end elevation view of the bracket of Fig. 9.

Various forms of the material discharge element 13 may be used and the form best shown in Figs. 8 to 10 represents only one suitable form. This may comprise an L-shaped bracket having legs 50 and 60 and with an elongated slot 61 in the leg 60. By adjustment of the leg 60 along a fixed bolt, extending through that slot, the entire element 13 with its attached scoop may be shifted with respect to the opening in the bottom plate of the receptacle. Upstanding from the distal end of the leg 50 is the guide 51 at the lower end of which is the projection 52. Any suitable means for affixing the scoop blade to the upper end of the guide may be used. Since, however, the flow of material by gravity toward a focus at projection 52 is significant, the upper edge of leg 50 is provided with a notch shown at 62 and the lower edge of that same leg is provided with a notch 63. Material which reaches the guide 51 by action of the scoop blade thus continues to flow downwardly without spreading laterally upon the leg 50 of the bracket. As a result of this guided movement, the mixed material dispensed from the mixer can be directed into small mold openings, as well as into large mold openings of the type seen in Fig. 1.

Having thus described one form of apparatus embodying the invention, the operation of the same will be self-evident and the advantages to be found in the mixing of the materials chosen as an example will be apparent to those skilled in the art. For example, liquids which undergo a chemical reaction upon contact with each other, such as the plastic foam ingredients, may be thoroughly mixed in the apparatus in about 1 to 3 seconds. Solid fillers and aggregates may be added thereto while in the mixing apparatus, since the transfer slots in the chamber-defining means will readily accommodate such materials and the scoop blade will likewise remove such materials readily from the collecting region. The apparatus, moreover, is not sensitive to the leading of one ingredient with respect to another through the mixing stages as is often the case with conventional continuous and rapid mixing devices.

Furthermore, and of significance, no entrainment of any substantial amount of air is produced in the mixed materials and the apparatus itself is self-cleaning and does not require disassembly for cleaning following a cycle of mixing.

In accordance with the Patent Statutes, I have described what at present is considered to be the preferred embodiment of my invention, but it will be obvious to those skilled in the art that various changes and modifications may be made therein without departing from the true spirit and scope of the invention, and I, therefore, aim to cover, in the appended claims, all such equivalent variations and modifications.

What I claim as new and desire to secure by Letters Patent of the United States is:

1. In a continuous mixing apparatus, a rotatable non-horizontally mounted hollow receptacle, means for driving said receptacle, means for separately supplying a plurality of materials to be mixed into a first end of said receptacle during its rotation, means for removing mixed materials from a second end of said receptacle during its rotation, chamber-defining means forming a portion of said drive means and defining an upper and a lower chamber within said receptacle, said chamber-defining means including apertures spaced from each other and connecting said upper and lower chambers, an apertured floor plate for said receptacle adjacent the second end thereof and defining with the interior wall of said lower chamber a collecting region for mixed material, and a material discharge element forming a portion of said material removing means and projecting through the aperture in said floor plate and extending into scooping relation to the material in said collecting region.

2. Apparatus as defined in claim 1 wherein said material discharge element includes a scoop member curved in a direction opposite the direction of rotation of said receptacle.

3. Apparatus as defined in claim 1 wherein said material discharge element includes a scoop member selectively adjustable as to its depth of extension into said material collecting region, said scoop member being curved in a direction opposite the direction of rotation of said receptacle.

4. Apparatus as defined in claim 1 wherein said apertures in said chamber-defining means have a slope extending opposite the direction of rotation of said receptacle thereby to assist in flowing material from said upper to said lower chamber during rotation of said receptacle.

5. In a continuous mixing apparatus, a rotatable non-horizontally mounted hollow receptacle open at each end to the atmosphere, means for driving said receptacle, means for supplying a plurality of materials to be mixed into a first end of said receptacle during its rotation, means for removing mixed materials from a second end of said receptacle during its rotation, chamber-defining means forming a portion of said drive means and defining an upper and a lower chamber within said receptacle, said chamber-defining means including apertures connecting said upper and lower chambers adjacent the walls thereof, the walls of said chambers being sloped outwardly from the first to the second end of said receptacle, an apertured floor plate for said receptacle adjacent the second end thereof and defining with the sloping wall of said lower chamber a collecting region for mixed materials, and a material discharge element forming a portion of said material removing means and projecting through the aperture in said floor plate and extending into scooping relation to the material in said collecting region.

6. Apparatus as defined in claim 5 wherein said chamber-defining means includes a drive shaft extending outwardly of said receptacle through the open end thereof at which materials enter said receptacle.

7. Apparatus as defined in claim 5 wherein the edge of said aperture in said floor plate is bevelled in a direction serving to move material under the action of centrifugal force toward said collecting region.

8. Apparatus as defined in claim 5 wherein the distance from the axis of the receptacle to the edge of the aperture in said floor plate is no greater than the distance from the axis of the receptacle to the edge of the apertures in said chamber-defining means.

9. In a continuous mixing and dispensing apparatus, a rotatable non-horizontally mounted hollow receptacle, means for driving said receptacle, means for supplying a plurality of materials to be mixed into a first end of said receptacle during its rotation, means for removing and dispensing mixed materials from a second end of said receptacle during its rotation, chamber-defining means forming a portion of said drive means and defining an upper and a lower chamber within said receptacle, said chamber-defining means including apertures connecting said upper and lower chambers, and an apertured floor plate for said receptacle adjacent the second end thereof and defining with the interior wall of said lower chamber a collecting region for mixed materials, said means for removing and dispensing the mixed materials including a non-horizontally mounted flow-directing-guide having at its lower end a projection from which material may drip and be dispensed and at its upper end a portion projecting into said lower chamber, a curved scoop member attached to the upper end of said guide and projecting into scooping relation to material confined in said collecting region, and bracket means extending from said guide externally of said receptacle and adapted to mount said guide.

10. Apparatus as defined in claim 9 including means for adjustably positioning said bracket means thereby to vary the location of said scoop member with respect to said collecting region.

11. Apparatus as defined in claim 9 wherein said scoop member has a greater width at its junction with said guide than at its end projecting into said collecting region.

12. Apparatus as defined in claim 9 wherein the lower edge of said scoop member is disposed in cleaning contact with the upper surface of said floor plate.

References Cited in the file of this patent

UNITED STATES PATENTS

| | | |
|---|---|---|
| 2,318,293 | Cornell | May 4, 1943 |

FOREIGN PATENTS

| | | |
|---|---|---|
| 43,353 | France | Feb. 19, 1934 |
| 688,113 | Great Britain | Feb. 25, 1953 |